June 21, 1955

F. F. HEITZIG 2,711,123

TWO-WAY PLOWS

Filed Sept. 11, 1953

INVENTOR.
FRED F. HEITZIG.

BY *[signature]*

ATTORNEY.

June 21, 1955  F. F. HEITZIG  2,711,123
TWO-WAY PLOWS
Filed Sept. 11, 1953  4 Sheets-Sheet 2
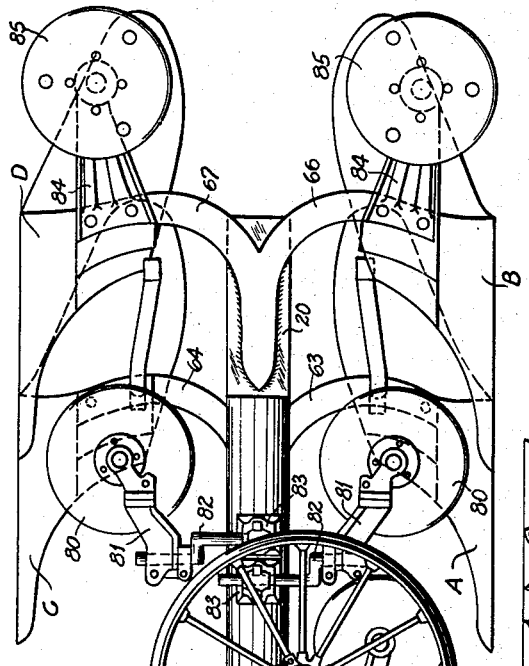
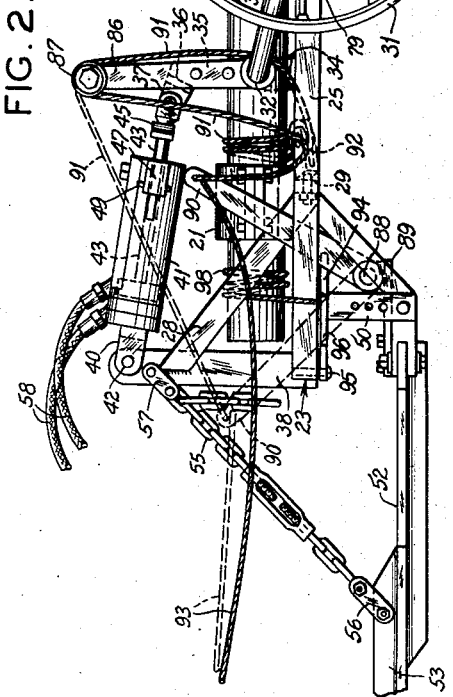
FIG. 2.
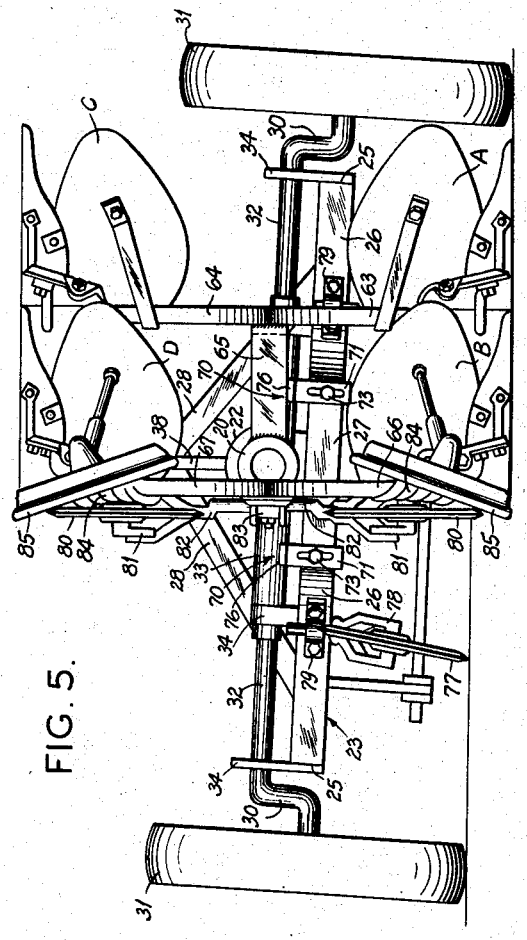
FIG. 5.
INVENTOR,
FRED F. HEITZIG,
BY *A. G. Fisher*
ATTORNEY.

June 21, 1955   F. F. HEITZIG   2,711,123
TWO-WAY PLOWS

Filed Sept. 11, 1953   4 Sheets-Sheet 3

INVENTOR,
FRED F. HEITZIG,
BY *A. E. Fisher*
ATTORNEY.

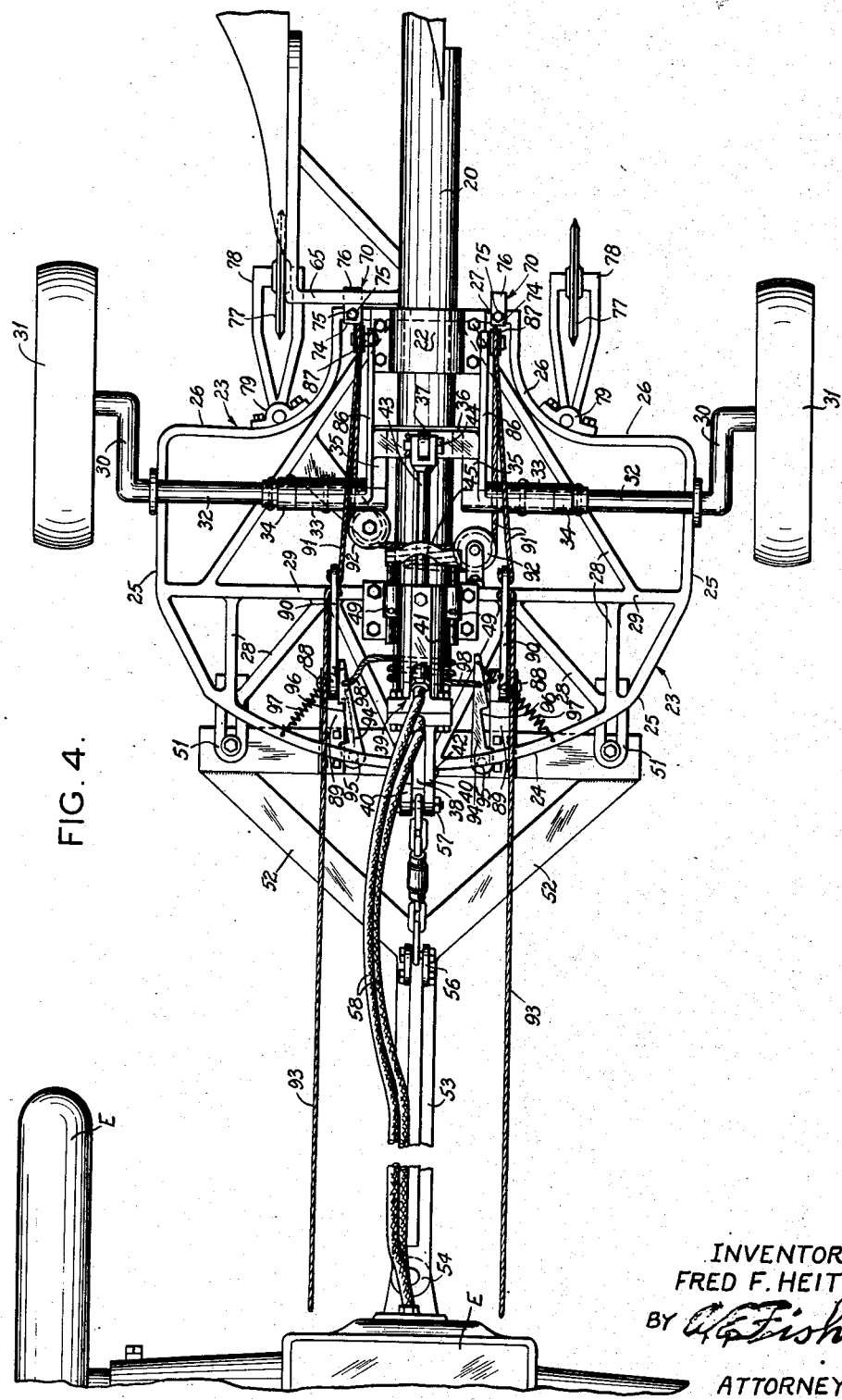

United States Patent Office 2,711,123
Patented June 21, 1955

2,711,123

TWO-WAY PLOWS

Frederick F. Heitzig, Fieldon, Ill.

Application September 11, 1953, Serial No. 379,644

5 Claims. (Cl. 97—26)

This invention relates generally to improvements in tractor plows and more particularly to the type of plow known as the two-way plow, which travels back and forth across the field and takes the furrow slices off the same end of the land each trip. In addition to eliminating dead furrows and back ridges this two-way plowing is very desirable for terracing and other modern top soil and moisture conserving farming methods.

It will, of course, be understood that a two-way plow thus has right and left hand plow bottoms which are used alternately according to the direction the machine is traveling, and provision must therefore be made for lifting each set of bottoms into the clear at the end of the furrow, while lowering the other set into plowing position. There are at present on the market machines in which the bottoms are turned about in horizontal or vertical planes; but in accordance with my invention, and as an important object thereof, I provide right and left hand plow units arranged to turn about a generally horizontal and longitudinal axis, along with comparatively simple mechanism for positioning the plows as required. In a two bottom plow, for example, four bottoms are required and this mounting of the plows for movements about an axis parallel with the direction of travel enables me to obtain a maximum of clearance for the necessary operations of the plows, with a minimum of overall height and resulting very low center of gravity for the machine as a whole.

Another object of my invention is to provide a two-way plow of comparatively light draft and relatively unchanging line of draft regardless of which set of plow bottoms may be in use. One virtue of the two-way plowing principle is its utility in sidehill work and this unchanging draft line, along with the low center of gravity of the machine aforementioned will be of particular advantage in such work.

Another object of my invention is to provide a two-way plow constructed in a practical fashion, to properly level the plow bottoms as the shift is made from one set to the other, and in which the plows are raised and lowered to and from transport position hydraulically, with provision for convenient adjustment of the plowing depth.

A further object is to provide a two-way plow wherein the plow bottoms are shifted or oscillated at the ends of the furrows by mechanism operated upon raising the frame, and which mechanism is itself of simple and durable construction, consisting of cables arranged to turn the plow assembly, and operated by selective control of trip ropes extended forwardly for control by the tractor operator from his seat on the tractor.

These and other objects and advantages of my invention will be made apparent in the course of the following detailed specification, wherein reference is made to the accompanying drawings, in which—

Fig. 2 is a similar view with the bottoms in plowing position.

Fig. 4 is a plan view of the frame and spindle.

Fig. 5 is a rear view with the bottoms in plowing position on the right side. Parts in background are omitted for sake of clarity.

Figure 1:
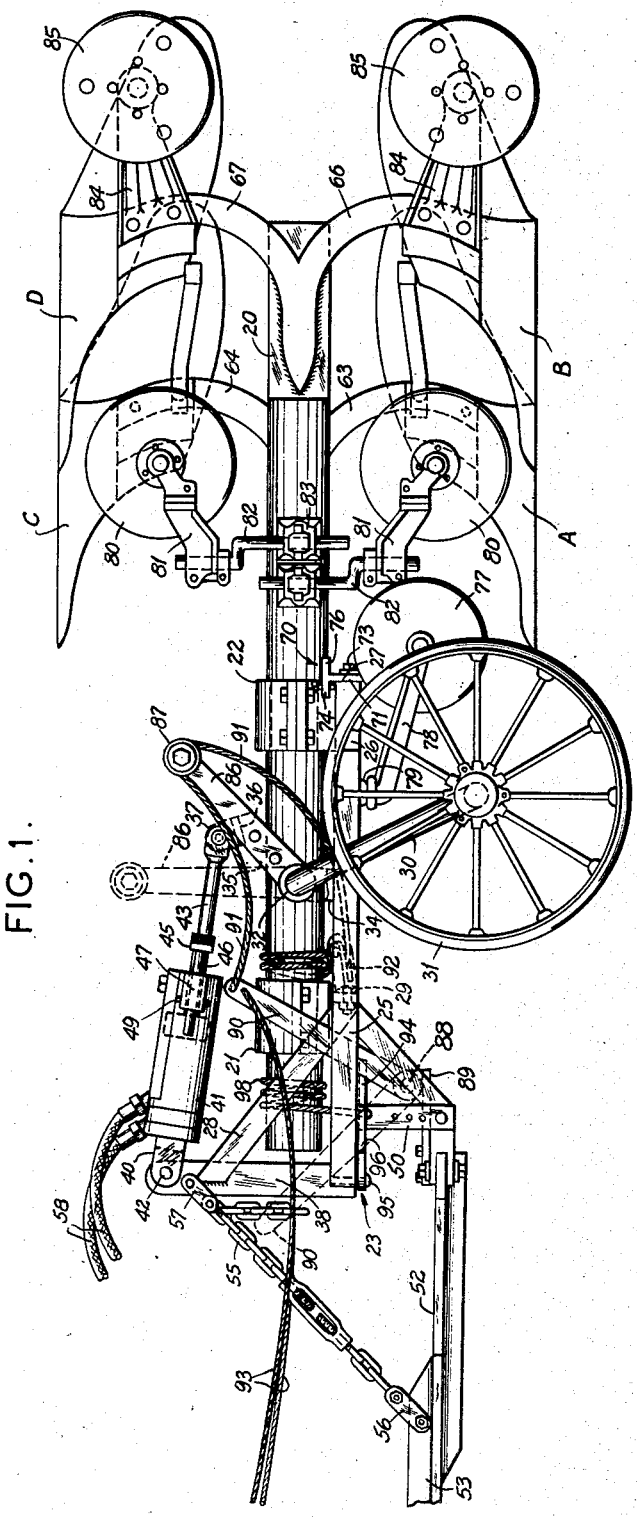
Fig. 1 is a side elevation of a two-way plow according to my invention, showing the same in its transport position.

Referring now more particularly and by reference characters to the drawing, I have disclosed my two-way plow therein as having a pair of right hand bottoms A—B and a pair of left hand bottoms C—D, which pairs are arranged to be brought alternately into a lower position for plowing by successive half turns or oscillations about a generally horizontal and longitudinal axis. This turnover plow assembly or group is carried on a heavy center bearing member or spindle 20 of tubular construction, journaled at its forward end portion in and through front and rear journals 21 and 22 and carried upon the main frame of the plow, as designated generally at 23. The details of the plow assembly, mounting and operation will presently appear.

Figure 7:
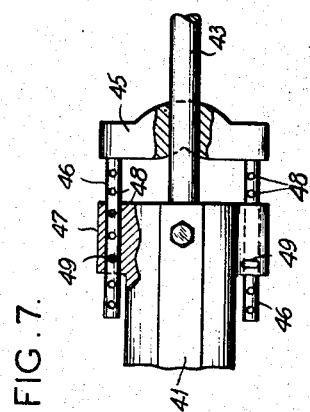
Fig. 7 is an enlarged, fragmentary plan view, partially in section, of the rear part of the height adjusting ram, showing the manner in which the plowing depth is adjusted.

The main frame 23 has a forward portion 24 from which side members 25 extend rearwardly and curve inwardly at 26 and terminate finally in a short rear portion 27. Suitable diagonal braces, designated throughout at 28, tie this frame structure rigidly together, along with a main cross member 29. Conventional crank axles 30, on which ground wheels 31 are journaled, have their upper pintle portions 32 turned inwardly across the top of the frame and fixed in sleeves 33 which are journaled in bearings 34 carried by the frame. The sleeves 33 are spaced apart at the center of the frame and joined to upwardly and rearwardly turned arms 35 connected by a cross bar 36 on which is affixed an apertured lug 37. The front center of the frame 23 has an upright 38 spaced well forward of the cross bar 36, and a hydraulic lift ram 39 is provided, having the lugs 40 at the forward end of its cylinder 41 pivoted at 42 to this upright. The rearwardly projecting plunger 43 of the ram is forked and pivotally attached at 44 to the lug 37 in such fashion that the rearward extension of the plunger, by fluid entering the forward end of the cylinder 41, will swing the arms 35 and turn the attached sleeves 33 and pintles 32 in a clockwise direction as viewed in Fig. 1, and vice versa. Obviously this clockwise motion of the pintles 32 will swing the crank axles 30 downward to elevate the frame, while the opposite motion will lower the frame. The down motion of the frame will determine the plowing depth in the usual fashion and to limit this motion, and select the plowing depth, a crosshead 45 is mounted on the ram plunger 43 and carries forwardly turned pins 46 at its ends which slide through apertured lugs 47 on the sides of the ram cylinder. These pins 46 each have a series of openings 48 (Fig. 7) and by the proper placement of pins 49 in the respective lug and pin openings the forward, return motion of the plunger in lowering the frame may be selected and limited by engagement of the rear end of the plunger with the crosshead 45 to secure the desired effect, in a well known manner.

The forward end of the frame 23 has transversely spaced depending hitch lugs 50, apertured for hitch height adjustment, and clevis fittings 51 attach a triangular hitch frame 52 to these lugs at various and selected elevations. A draft tongue 53 is secured to the converging forward end of this hitch frame for attachment, as indicated at 54, to the drawbar of the conventional tractor used for pulling the plow, and a rear portion of which is designated generally at E. A chain 55 is attached at 56 to the forward end of the hitch frame 52, and may be secured by selected links to a fitting 57 on the upper part of the front upright 38 of the frame 23. It is obvious that the adjustment of this chain will level the entire plow assembly in a fore and aft plane, and may be used to select the proper entering angles for the plow bottoms (A through D) for best plowing.

Fluid for operation of the hydraulic lift ram 39 is supplied through flexible conduits 58 leading to the tractor E which has the usual pump, reservoir and control valve (not shown) with which most modern tractors are equipped.

Figure 6:
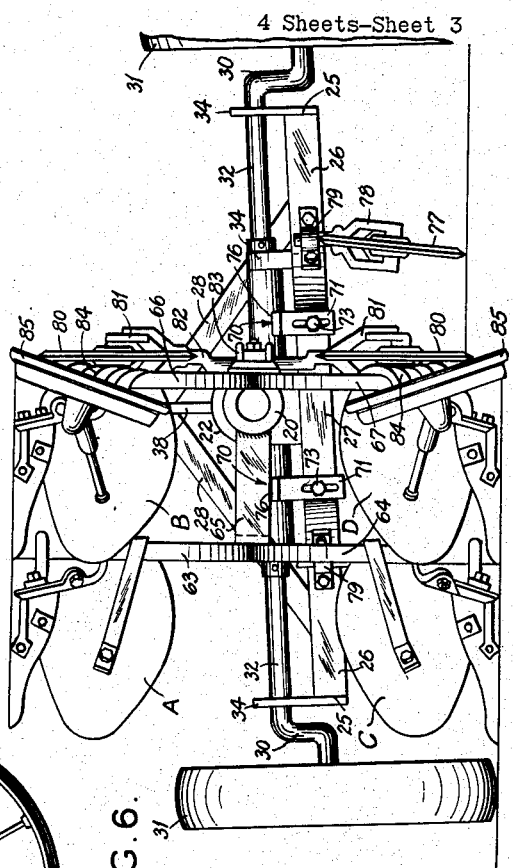
Fig. 6 is a similar view with the plows on the left side. Parts in background are omitted for sake of clarity.

The plow bottoms A through D are, as stated, carried as an oscillating, turn-over assembly upon the spindle 20 which is a heavy tubular member extending rearwardly from the center of the frame 23. The front and rear bearings 21 and 22 journal this spindle 20 for oscillating, rocking motions about a generally horizontal, longitudinal axis as will be readily apparent. The right and left hand forward plow bottoms A and C are offset from the axis of the spindle, having their curved beams 63 and 64 rigidly attached to a heavy and rigidly braced radial member or arm 65 secured on the spindle. The right and left hand rear bottoms B and D are attached by their curved beams 66 and 67 directly to the side of the spindle opposite that from which the arm 65 extends, thus properly offsetting the front and rear bottoms for turning the two furrow slices of proper width. It will be noted, particularly in Figs. 5 and 6, that the bottoms are thus so placed that as either the right or left hand pair are down in plowing position, the unused pair is immediately overhead, and the weight is thus so distributed about the axis of the spindle 20 as to hold the working units in the ground. Also it will be apparent that successive half-turn, oscillatory movements of the spindle and its assembled plow units, will bring the right and left hand bottoms alternately into their working position, but that in each position the line of draft, with reference to the draft tongue 53 will be approximately the same, to facilitate side hill work in particular. Further it will be evident that the turning of the plows about a longitudinal axis requires a minimum of vertical clearance, particularly in a two bottom plow, and that thus the overall height of the machine is kept at a minimum with a resulting low center of gravity and improved operation in general, as referred to hereinbefore.

As the plow assembly turns in either direction, to bring the right or left hand bottoms into plowing position, the arm 65 comes to rest upon stops or stop brackets 70 spaced at opposite sides of the spindle 20 upon the short, rear cross member 27 of the main frame. These stops are T-shaped and each has a depending leg 71 vertically slotted to receive a cap screw 73, by which it is held upon the rear face of the said frame member 27. The head of the bracket has a forwardly projecting portion 74 which overlies the frame member 27 and carries a set screw 75 so that, when the cap screw 73 is loosened, the bracket may be raised or lowered quite precisely and then locked by tightening the cap screw. The stop bracket also has a rearwardly turned finger 76 which lies in the path of the arm 65 as the plow assembly swings. Such adjustments of these stops obviously will precisely limit the turn over movement of the plow assembly to properly level the plow bottoms in transverse planes.

For the forward plow bottoms A and C, coulters 77 are provided on the frame 23 in proper spacing at opposite sides of the spindle 20. These coulters are mounted by conventional forks 78 and brackets 79 on the incurving rear ends 26 of the frame, so as to run in proper relation to the plow points. Due to the transverse tilt of the frame, when one wheel 31 runs in the furrow as seen in Fig. 5, the coulter 77 will substantially clear the ground. For the rear bottoms B and D coulters 80 are carried by the usual forks 81, cranked supporting stems 82, and brackets 83 upon the same side of the spindle 20 as the rear beams 66 and 67 are mounted. Also attached to these beams 66 and 67 are arms 84 which carry inclined furrow wheels 85 adapted to run, at the junction of the furrow wall and side, as seen in Fig. 5, for the usual purpose.

The plow bottom assembly is turned over, in first one direction and then the other, by mechanism operated when the plow frame is raised to transport position, as will now be described.

When it is desired to raise the plows at the end of a furrow the operator on the tractor E operates a valve, not shown, to admit pressure fluid to the cylinder 41 via the tubes 58. The pressure thereupon forces the plunger 43 to the rear, thereby swinging the cross bar 36 and the arms 35 to the rear, rotating the pintles 32 to force the wheels 31 downward and raise the frame and the spindle 20 to lift the plows out of the ground. The arms 35 and the cross bar 36 thus form together an actuator for swinging the ground wheels.

Rigidly attached to the arms 35 are the extension arms 86 which thus form an extension of said actuator. Each of the arms 86 carries at its end a sheave 87. Pivoted at 88 on suitable brackets 89 on the frame, are levers 90, one on each side of the cylinder 41. Cables 91 are secured to the ends of the levers 90 and, after passing over the sheaves 87 and idler sheaves 92 on the frame, are wound around the spindle 20 and secured thereto after one or two turns at a point forward of the pintles 32. These cables are wound oppositely; that is, so that tension on one of them will turn the spindle in one direction and tension on the other in the opposite direction. This may actually be all one cable secured to the spindle at its middle point, but each half functions separately to turn the spindle. Control lines 93 are secured to the ends of the levers 90 and pass to the operator's seat on the tractor E. Latch levers 94, pivoted at 95 on the frame, have notches 96 adapted to engage the levers 90 to lock the same and are biased by springs 97. Connected to the latches 94 are cables 98 which are wound on the spindle 20 in such a manner that when the spindle, rotating under the tension of one of the cables 91, completes half a turn, the cable 98 on the same side of the spindle as the tensioned cable 91 pulls the latch 94 out of engagement with the lever 90 connected to said tensioned cable, to release the tension thereon.

Figure 3:
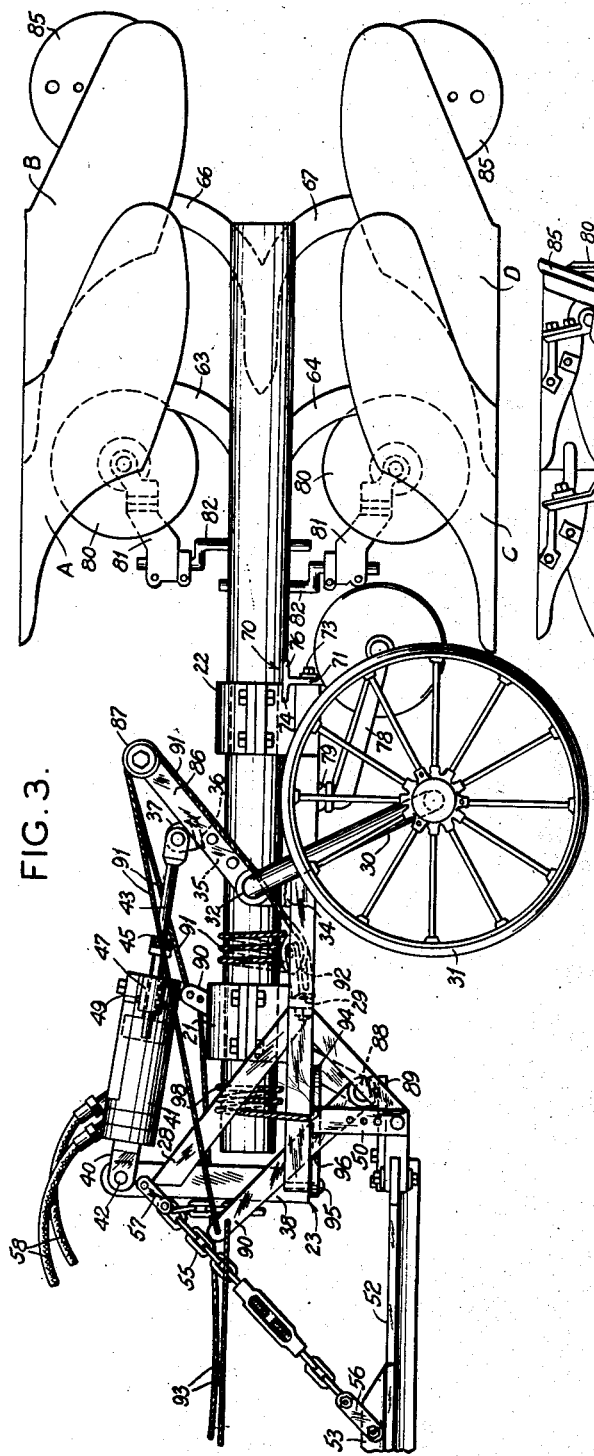
Fig. 3 is a similar view with a control lever set for raising the plows.

In the operation of this portion of the mechanism, when the plow arrives at the end of a furrow the operator pulls the appropriate line 93 to swing the attached lever 90 forward until it is locked in its forward position by the latch 94. This takes up all slack in the cable 91 connected to that lever. The operator then admits pressure to the cylinder 41, which forces the plunger 43 to the rear. This swings actuator 35, 36, 86 to the rear on its pivot on the pintles 32, actuating said pintles and the crank axles 30 to swing the wheels 31 and raise the frame, thereby lifting the plows out of the ground. At the same time the rearward movement of the actuator 86 carries the sheave 87 rearward, thereby increasing the distance covered by the cable 91 from the end of the locked lever 90, around the sheave 87 and back to the idler sheave 92 as may be seen from Fig. 3. This puts tension on said cable and causes the spindle 20 to rotate through one-half revolution, reversing the positions of the plow groups A—B and C—D. At the end of this movement the cable 98 releases the latch 94, freeing the locked lever 90 for the next operation in the reverse direction.

Thus it will be seen that the alternating operations at the ends of the furrows may be carried out merely by the operator pulling the proper control line and lifting his plow from the ground. The action is thus simple and straightforward and the mechanism is simple in construction as well as durable and trouble-free.

While I have herein set forth a certain preferred embodiment of my invention it is understood that I may vary therefrom within the spirit of my invention and scope of the appended claims.

What I claim as new and desire to secure by Letters Patent is:

1. In a two-way plow of the character described, the combination comprising, a frame, ground wheels swingably connected to the frame for raising and lowering the same, bearing means on the frame, a spindle journaled in the bearings for oscillating movements about a generally horizontal and longitudinal axis, right and left hand plow bottoms carried by the spindle and movable therewith to dispose the plows alternately in plowing positions, cables connected to the spindle and wound thereon in opposite directions, means selectively operative to take up and pay out the slack in the respective cables, and power means on the frame for swinging said wheels to raise the frame, said power means cooperating selectively with said take-up means as the frame is raised for pulling on a slackless cable and oscillating the spindle and plow bottoms.

2. In a two-way plow of the character described, the combination comprising a frame, ground wheels swingably connected to the frame for raising and lowering the same, bearing means on the frame, a spindle journaled in the bearings for oscillating movements about a generally horizontal and longitudinal axis, right and left hand plow bottoms carried by the spindle and movable therewith to dispose the plows alternately in plowing positions, cables connected to the spindle and wound thereon in opposite directions, selective control means operative to tauten and loosen the respective cables, means automatically locking said control means in tautening position, power means for swinging said wheels to raise the frame, means cooperating with said power means as the frame is raised for pulling on a tautened cable and oscillating the spindle and plow bottoms, and means operative as the spindle moves a half turn to disengage said locking means.

3. In a two-way plow of the character described, the combination comprising, a frame, ground wheels swingably connected to the frame for raising and lowering the same, bearing means on the frame, a spindle journaled in the bearings for oscillating movements about a generally horizontal and longitudinal axis, right and left hand plow bottoms carried by the spindle and movable therewith to dispose the plows alternately in plowing position, cables connected to the spindle and wound oppositely thereon whereby tension on a cable causes rotation of the spindle, means for holding each cable in tautened condition and for releasing it, a power-operated actuator connected to swing said ground wheels, means on said actuator operataively engaging said cables between the spindle and the holding means and operative to further tension the cables, means for holding and releasing each of said cables, and means operative under manual control for selectively and alternately locking said holding means in cable tautening position whereby operation of said actuator causes tension on a cable to rotate the spindle.

4. In a two-way plow of the character described, the combination comprising, a frame, ground wheels swingably connected to the frame for raising and lowering the same, bearing means on the frame, a spindle journaled in the bearings for oscillating movements about a generally horizontal and longitudinal axis, right and left hand plow bottoms carried by the spindle and movable therewith to dispose the plows alternately in plowing position, cables connected to the spindle and wound oppositely thereon whereby tension on a cable causes rotation of the spindle, a power-operated actuator connected to swing said ground wheels, means on said actuator operatively engaging said cables to apply tension thereto when cable slack has been taken up, levers pivoted on said frame and respectively connected to said cables on the opposite side of said actuator from their connections to said spindle, means operative under manual control for selectively and alternately moving and locking said levers in a position wherein cable slack is taken up whereby operation of said actuator causes tension on a cable to rotate the spindle, and means operating to unlock the locked lever at the end of the spindle's rotation.

5. In a two-way plow of the character described, the combination comprising, a frame, ground wheels swingably connected to the frame for raising and lowering the same, bearing means on the frame, a spindle journaled in the bearings for oscillating movements about a generally horizontal and longitudinal axis, right and left hand plow bottoms carried by the spindle and movable therewith to dispose the plows alternately in plowing position, cables connected to the spindle and wound oppositely thereon whereby tension on a cable causes rotation of the spindle, a power-operated actuator connected to swing said wheels to raise the frame by rearward movement of the actuator with respect to the frame, levers pivoted on the frame, said cables passing over sheaves on said actuator and being connected respectively to said levers, and means operative under manual control for selectively and alternately moving said levers to forward positions on the frame to take up slack in their associated cables whereupon rearward movement of said actuator to swing said wheels causes tension on a cable to rotate the spindle.

References Cited in the file of this patent
UNITED STATES PATENTS

| Number | Name | Date |
|---|---|---|
| 2,543,786 | Lindeman | Mar. 6, 1951 |
| 2,573,969 | Heitzig | Nov. 6, 1951 |
| 2,591,711 | Moore | Apr. 8, 1952 |
| 2,625,089 | Pursche | Jan. 13, 1953 |